(12) United States Patent
Suzuki

(10) Patent No.: US 8,431,269 B2
(45) Date of Patent: Apr. 30, 2013

(54) BATTERY INCLUDING BATTERY CASE AND SEALING PLATE

(75) Inventor: Satoshi Suzuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 576 days.

(21) Appl. No.: 12/669,061

(22) PCT Filed: Jul. 17, 2008

(86) PCT No.: PCT/JP2008/062950
§ 371 (c)(1),
(2), (4) Date: Jan. 14, 2010

(87) PCT Pub. No.: WO2009/014068
PCT Pub. Date: Jan. 29, 2009

(65) Prior Publication Data
US 2010/0190053 A1    Jul. 29, 2010

(30) Foreign Application Priority Data
Jul. 23, 2007  (JP) .................................. 2007-191449

(51) Int. Cl.
*H01M 2/00*    (2006.01)
(52) U.S. Cl.
USPC ........... 429/163; 429/138; 429/151; 429/153; 429/167; 429/168; 429/175; 429/176; 429/177; 429/180
(58) Field of Classification Search .................. 429/138, 429/151, 153, 163, 167, 168, 175–177, 180
See application file for complete search history.

(56) References Cited

U.S. PATENT DOCUMENTS 6,627,348 B1    9/2003  Haraguchi et al.
2006/0207085 A1*  9/2006  Nakagawa et al. .......... 29/623.1

FOREIGN PATENT DOCUMENTS

| JP | 11-260326 | 9/1999 |
|---|---|---|
| JP | 2000-21365 | 1/2000 |
| JP | 2000-133211 | 5/2000 |
| JP | 2002-75293 | 3/2002 |
| JP | 2004-195490 | 7/2004 |
| JP | 2006-260883 | 9/2006 |
| JP | 2006-351234 | 12/2006 |

* cited by examiner

*Primary Examiner* — Patrick Ryan
*Assistant Examiner* — Ben Lewis
(74) *Attorney, Agent, or Firm* — Finnegan, Henderson, Farabow, Garrett & Dunner, LLP

(57) ABSTRACT

A battery provided by the present invention includes a sealing plate (20) for closing an opening portion in a case for housing an electrode body unit. A fitting convex portion (24) that intrudes into the case opening portion when the sealing plate is attached to a predetermined position of the case opening portion is formed on a rear surface side of the sealing plate. The sealing plate is subjected to thickness increasing molding in a pressing process such that at least a part (27A) of an outer peripheral part (25, 27) of the fitting convex portion that contacts a peripheral edge of the case opening portion is thicker than an inner part (28) of the fitting convex portion that does not contact the peripheral edge of the case opening portion.

10 Claims, 5 Drawing Sheets

BATTERY INCLUDING BATTERY CASE AND SEALING PLATE

TECHNICAL FIELD

The present invention relates to a battery including a case housing an electrode body unit and a sealing plate, and more particularly to a sealing structure provided between a main body of the battery case and the sealing plate (lid member) and a shape of the sealing plate.

This application is a national phase application of International Application No. PCT/JP2008/062950, filed Jul. 17, 2008, and claims priority of Japanese Patent Application No. 2007-191449, filed on Jul. 23, 2007, the entire contents of both of which are incorporated into this specification by reference.

BACKGROUND

Various batteries, for example lithium secondary batteries such as lithium ion batteries, chemical cells such as nickel hydrogen secondary batteries, and physical cells such as electric double layer capacitors, are used as power sources installed in vehicles that use electricity as a drive source, personal computers, and other electrical products. A battery in which a predetermined electrode body unit and an electrolyte are sealed into the interior of a metal case may be cited as a typical example of this type of battery.

The battery case used in this type of battery may take various shapes, but in the case of a battery installed in a vehicle, for example, a shape that permits a large number of batteries to be arranged neatly so as to make efficient use of limited space is preferable, and an angular case having a flat rectangular shape that corresponds to an electrode body unit having a flat shape such as a wound shape or a stacked shape so as to be able to house the electrode body unit may be cited as a typical example thereof.

This type of battery is assembled by housing a predetermined electrode body unit in a case (case main body), attaching a predetermined sealing plate (in other words, a lid member for closing an opening portion of the case; likewise hereafter) to the opening portion of the case (in other words, a housing opening for housing the electrode body unit; likewise hereafter), and then welding the sealing plate to a peripheral edge of the opening portion to seal the case opening portion. Patent Document 1 describes a technique of welding a sealing plate to the peripheral edge of a case opening portion of an angular case main body efficiently as a related art technique. Patent Document 2 describes a sealing plate used to seal an opening portion of a battery case, which is structured such that a projecting portion is formed in the vicinity of a safety valve formed on a thin film.

Patent Document 1: Japanese Unexamined Patent Application Publication No. 2004-195490

Patent Document 2: Japanese Unexamined Patent Application Publication No. 2006-351234

DISCLOSURE OF THE INVENTION

To secure a predetermined welding strength, facilitate positioning, and so on, a rear surface side (the surface side that is oriented toward the inside of the case when the sealing plate is attached to the case opening portion; likewise hereafter) of a sealing plate for a comparatively large battery such as a battery installed in a vehicle is formed with a part (to be referred to as a "fitting convex portion" hereafter) that intrudes into the opening portion of the case main body (see the sealing plate illustrated in Patent Document 1, for example). To achieve reductions in the weight, manufacturing cost, and so on of the battery, it is desirable to reduce the thickness of the sealing plate, and therefore the thickness of the fitting convex portion tends to be reduced in such cases.

Meanwhile, in a battery (a lithium secondary battery or the like) having a flat electrode body unit for vehicle installation, for example, the peripheral edge distance of the opening portion is longer than that of a conventional battery for a typical application (a mobile, for example), and therefore the welding distance between the case main body and the sealing plate also increases. When the welding distance increases, the probability of a positioning defect when the sealing plate is fitted or a welding defect caused by laser leakage increases. In particular, when a thin sealing plate is used, the fitting convex portion is also thin, and therefore a part in which the case opening portion peripheral edge and the sealing plate fitting convex portion overlap (in other words, a fitting step) is small, leading to a further increase in the probability of such positioning defects and welding defects.

To reduce the frequency of positioning defects, and therefore welding defects, or to secure sufficient welding strength, the thickness of the fitting convex portion (i.e., the rear surface-side step from a main body portion (substrate) bottom surface of the sealing plate to a top surface of the fitting convex portion) may be increased. In other words, the overlapping part (i.e. the fitting step) between the fitting convex portion and the case main body (a peripheral wall portion of the opening portion peripheral edge) when the sealing plate is attached to the case opening portion may be increased.

However, an increase in the thickness of the fitting convex portion of the sealing plate leads to an increase in the size (thickness) of the sealing plate, and as a result, an undesirable increase in manufacturing cost occurs due to the resulting increase in material costs and processing costs. In other words, from an economical standpoint, i.e. the use of a low-cost sealing plate, it is preferable to employ a sealing plate that is as thin as possible.

The present invention has been designed to solve the conventional problems described above relating to the welding of a battery in which the welding distance between a sealing plate and a case is comparatively long, such as a battery installed in a vehicle, and it is an object thereof to provide a sealing plate with which the occurrence of positioning defects and welding defects in the sealing plate can be forestalled while preventing an increase in the overall thickness of the sealing plate, which leads to an increase in manufacturing costs, and a battery including this sealing plate. Another object of the present invention is to provide a method of manufacturing a battery including this type of sealing plate.

A battery provided by the present invention includes an electrode body unit, a case having a shape that corresponds to a shape of the electrode body unit, and a sealing plate for closing an opening portion of the case in which the electrode body unit is housed.

In the battery provided by the present invention, a rear surface side of the sealing plate is formed with a fitting convex portion that intrudes into the case opening portion when the sealing plate is attached to a predetermined position of the case opening portion. The sealing plate is subjected to thickness increasing molding in a pressing process such that at least a part of an outer peripheral part of the fitting convex portion that contacts a peripheral edge of the case opening portion is thicker than an inner part of the fitting convex portion that does not contact the peripheral edge of the case opening portion.

Note that in this specification, the "battery" denotes a storage device from which predetermined electric energy can be extracted, and is not limited to a specific storage mechanism (electrode body or electrolyte constitution). Here, the term "battery" encompasses typical examples such as a lithium secondary battery, a nickel hydrogen secondary battery, or another secondary battery, and a capacitor such as an electric double layer capacitor (i.e. a physical cell).

Further, in this specification, the "electrode body unit" denotes a structure forming a main body of the battery (storage device) and including at least one each of a positive electrode and a negative electrode.

Further, in this specification, the "case" denotes a battery casing serving as a constitutional member of the battery disclosed herein, which houses the electrode body unit and electrolyte and includes a predetermined opening portion (i.e. an electrode body unit housing opening).

In the battery according to the present invention, constituted as described above, a part of the outer peripheral part of the fitting convex portion of the sealing plate (i.e. the part that contacts the inner surface of a case peripheral wall forming the case opening portion) is increased in thickness in a pressing process. Thus, the thickness of at least the part of the outer peripheral part of the fitting convex portion that contributes to improvements in positioning precision and welding strength can be increased beyond the thickness of the inner part without increasing the thickness of the entire sealing plate. In other words, according to the present invention, the frequency of positioning defects and welding defects can be reduced without increasing the amount of material (for example, aluminum materials and stainless steel materials) used to manufacture the sealing plate by employing the sealing plate disclosed herein.

Hence, according to the present invention, the aforementioned fitting step can be increased without causing increases in manufacturing costs and weight (i.e. an increase in the amount of used raw materials), and therefore a highly reliable battery in which highly precise positioning and great welding strength (an improvement in the compression strength of the battery case) are secured can be provided.

Accordingly, the present invention provides, as a further aspect, a manufacturing method for a battery employing the sealing plate having the features disclosed herein.

In a preferred aspect of the battery disclosed herein, the increase in thickness in at least the part of the outer peripheral part of the fitting convex portion is realized by subjecting at least a part of the inner part of the fitting convex portion, which is adjacent to the increased thickness part, to thickness reduction molding in the pressing process.

By performing this pressing thickness reduction on the adjacent part, the desired part of the fitting convex portion outer peripheral part can be increased in thickness (subjected to thickness increasing molding) easily. Accordingly, the present invention provides, as a further aspect, a manufacturing method for a battery using a sealing plate in which at least a part of the inner part of the fitting convex portion adjacent to the increased-thickness molded part has been subjected to thickness reduction molding in a pressing process.

In another preferred aspect of the battery disclosed herein, a flat electrode body unit is used as the electrode body unit, and the case is a rectangular case (typically, a metal case made of aluminum, an aluminum alloy, or the like) in which the peripheral edge of the opening portion capable of housing the electrode body unit is constituted by a pair of case long side portions and a pair of case short side portions. Here, the increased-thickness molded part is formed on at least a part of a long side of the outer peripheral part of the fitting convex portion, which opposes the case long side portions.

In the flat battery having this constitution, the increased-thickness molded part is formed in the case long side portion. Thus, the fitting step between the sealing plate and the opening portion peripheral edge on the long side portion side of the flat case, in which positioning defects due to attachment offset are more likely to occur when the sealing plate is attached than in the case short side portion, can be increased, enabling an improvement in positioning precision on the case long side portion side. Hence, according to the present invention, a highly reliable flat battery (typically, a secondary battery such as a lithium ion battery having a wound or stacked electrode body unit) in which highly precise positioning and great welding strength are secured without causing increases in manufacturing costs and weight (i.e. an increase in the amount of used raw materials) can be provided.

In a preferred aspect of the flat battery provided by the present invention, the increased-thickness molded part may be formed on either end portion of the long side of the outer peripheral part of the fitting convex portion. Alternatively, the increased-thickness molded part may be formed in a central portion of the long side of the outer peripheral part of the fitting convex portion.

When the increased-thickness molded part is formed by performing a pressing process on only a part (either end portion or the central portion; see test example described below) of the long side rather than forming the increased-thickness molded part over the entire long side, a highly reliable flat battery in which highly precise positioning and great welding strength are secured easily can be provided.

In a particularly preferable aspect of the flat battery provided by the present invention, the increased-thickness molded part is not formed on a short side of the outer peripheral part of the fitting convex portion, which opposes the case short side portions.

The case short side portion side is a site in which so-called "scraping", whereby the case opening portion peripheral edge and the fitting convex portion front surface (side face) grind against each other with a large amount of force during attachment (fitting) of the sealing plate, is likely to occur. When scraping occurs, fallen particles (in other words, scrapings) originating from the scraping may enter the case housing the electrode body unit and the electrolyte, and when these scrapings (metal particles originating from a metal case, for example) become mixed into the interior of the battery, they cause internal short circuits and so on.

By ensuring that the increased-thickness molded part is not formed on the short side portion side of the sealing plate opposing the case short side portions (in other words, by preventing an increase in the fitting step), highly precise positioning and great welding strength can be realized through the formation of the increased-thickness molded part on the long side portion side opposing the case long side portions without increasing the frequency of scraping.

Hence, the present invention provides, as a further aspect, a method of manufacturing a flat battery that uses a sealing plate having any of the features disclosed herein.

BEST MODES FOR CARRYING OUT THE INVENTION

Preferred embodiments of the present invention will be described below. Note that in this specification, matter required to implement the present invention (for example, pressing conditions, means for welding a sealing plate to a battery case, the constitution of an electrode body unit and an electrolyte, various processes for manufacturing a battery) other than specifically cited items (for example, the shape and materials of the employed sealing plate and battery case) is to be understood as design matter to be dealt with by a person skilled in the art on the basis of the related art in this field. The present invention may be implemented on the basis of the content disclosed in this specification and common technical knowledge of this field.

As described above, the features of the battery (preferably a flat battery) according to the present invention are the shape (the increased-thickness molded part) of the sealing plate (more specifically, the rear surface side fitting convex portion) and the sealing structure of the case opening portion relating thereto, and hence there are no limitations on the type and constitution of the electrolyte and the electrode body unit. Typical examples of the battery provided by the present invention include, but are not limited to, a lithium ion battery or another lithium secondary battery, a nickel hydrogen secondary battery, and an electric double layer capacitor.

There are no particular limitations on the materials of the employed battery case and sealing plate, but to achieve the objects of the present invention, the case and the sealing plate are preferably made of metal. For example, the present invention may be applied favorably to a case and a sealing plate made of a steel material such as stainless steel or nickel-plated steel, aluminum, or an alloy thereof. Further, there are no particular limitations on the shape and size of the case and the sealing plate, but the present invention may be applied favorably to a battery having an electrode body and a case in which the shape of the case opening portion is rectangular, in particular a flat case in which the length of a long side portion of the case and the length of a short side portion of the case are dramatically different.

A preferred embodiment of the present invention using a lithium secondary battery (lithium ion battery) constituting a single cell of a battery pack installed in a vehicle as an example will be described in detail below.

Figure 1:
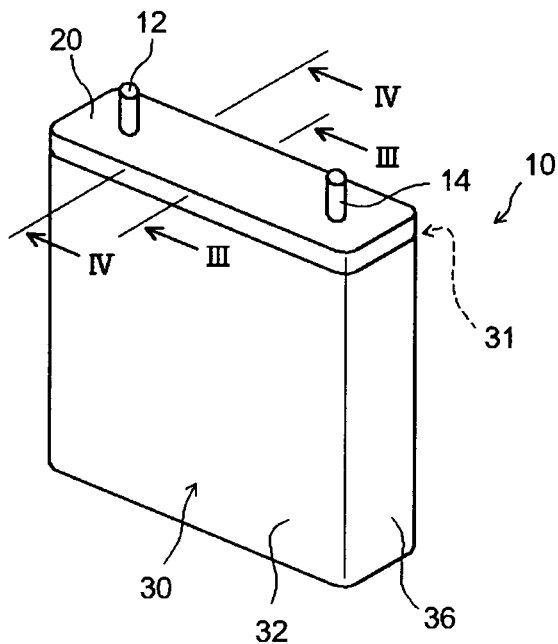
FIG. 1 is a perspective pattern diagram showing an outer form of a flat battery (a lithium ion battery) according to an embodiment.

FIG. 1 is a perspective view showing the outer form of a flat rectangular battery (lithium ion battery) 10 according to a first embodiment. As shown in the drawing, the battery (also referred to hereafter as an "angular battery") 10 according to this embodiment includes a metallic (aluminum, for example) rectangular case (also referred to hereafter as an "angular case") 30 and a sealing plate 20. The angular case 30 is a rectangular parallelepiped-shaped casing constituted by an opposing pair of long side portions (wide surfaces) 32, an opposing pair of short side portions (narrow surfaces) 36, and a bottom surface, not shown in the drawing, when seen from a case opening portion 31. One surface (the surface opposing the bottom surface) constitutes the rectangular opening portion 31, a peripheral edge of which is constituted by the pair of long side portions 32 and the pair of short side portions 36 mentioned above. A predetermined electrode body unit and a predetermined electrolyte can be housed in the interior of the case through the opening portion 31.

The electrode body unit housed in the case may be similar to an electrode body unit typically employed in a single cell of a typical battery pack installed in a vehicle, and there are no particular limitations thereon. In this embodiment, a wound electrode body unit formed by winding an elongated positive electrode collector (aluminum foil) formed in advance with an appropriate positive electrode active substance layer and an elongated negative electrode collector (copper foil) formed in advance with an appropriate negative electrode active substance layer together with an elongated separator (for example, a porous polyolefin resin sheet) and molding them into a flat shape may be housed in the case. Note that the constitution of the electrode body unit (the materials of the positive and negative electrode collectors and the separator, the composition of the active substance layers, and so on) is not a feature of the present invention, and therefore detailed description of the electrode body unit has been omitted.

Further, a similar electrolyte to that employed in a conventional lithium secondary battery may be used as the electrolyte housed in the case together with the electrode body unit, and there are no particular limitations on the content thereof. For example, an appropriate nonaqueous electrolyte (for example, a nonaqueous electrolyte such as a mixed solvent of diethyl carbonate containing an appropriate amount of a lithium salt such as $LiPF_6$ and ethylene carbonate) may be used favorably. The constitution of the electrolyte is not a feature of the present invention, and therefore detailed description of the electrolyte has been omitted.

As shown in FIG. 1, a sealing plate 20 for closing the case opening portion 31 after the electrode body unit and the electrolyte have been housed is attached to the top of the case opening portion 31.

Figure 2:
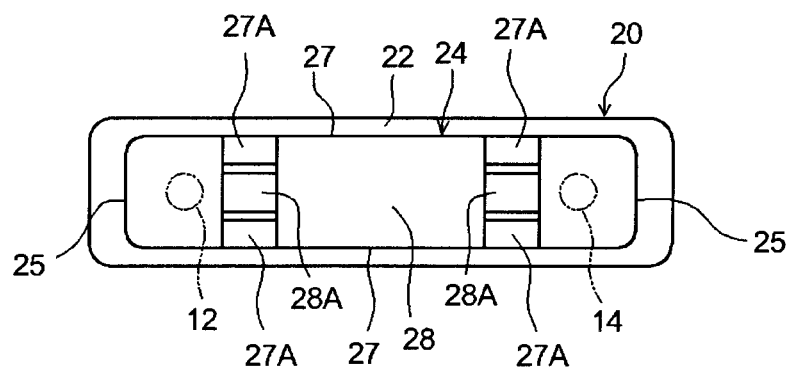
FIG. 2 is a plan view showing a rear surface side structure of a sealing plate provided in the battery according to this embodiment.

As shown in FIGS. 1 and 2, the sealing plate 20 according to this embodiment is constituted by a rectangular plate-shaped main body portion (substrate) 22 that is identical in size and shape to the bottom surface of the case and disposed on the case opening portion 31 to form one surface of the angular case 30, and a fitting convex portion 24 that is formed on a rear surface side of the main body portion 22 so as to intrude into the case opening portion when the sealing plate 20 is attached to the case opening portion.

Further, as shown in FIG. 1, the sealing plate 20 is provided with a positive terminal 12 and a negative terminal 14 for an external connection, and a part of these terminals 12, 14 protrudes from a front surface side of the sealing plate 20. The positive terminal 12 and negative terminal 14 are electrically connected respectively to the positive electrode collector and the negative electrode collector of the electrode body unit housed in the interior of the case.

Next, the rear surface side of the sealing plate 20 will be described in detail with reference to FIGS. 2 to 4. FIG. 2 is a plan view showing the rear surface side of the sealing plate 20.

As shown in FIG. 2, the fitting convex portion 24 is mainly constituted by outer peripheral parts 25, 27 contacting a peripheral edge (an inner wall surface of a peripheral wall) of the case opening portion 31, and an inner part 28 positioned on the inside (central side) of the outer peripheral parts 25, 27. As shown in FIG. 3, the front surface (top surface) of the fitting convex portion 24 is set at a predetermined height (between 0.5 and 1 mm in this type of battery, for example) from the main body portion 22 (rear surface), and is formed to be entirely flat apart from an increased-thickness molded portion 27A and a reduced-thickness molded portion 28A (FIG. 4) to be described below.

As shown in FIG. 2, the outer peripheral part of the fitting convex portion 24 is constituted by the part (to be referred to hereafter as a "convex portion long side portion") 27, which opposes the case long side portion 32, and the part (to be referred to hereafter as a "convex portion short side portion") 25, which opposes the case short side portion 36.

As shown in the drawing, the increased-thickness molded part 27A according to this embodiment is formed on the two end parts of each of the pair of convex portion long side portions 27 (i.e. in two locations per side for a total of four locations), and the reduced-thickness molded part 28A according to this embodiment is formed on the inner part 28 adjacent to the increased-thickness molded part 27A (i.e. in a total of two locations).

Figure 4:
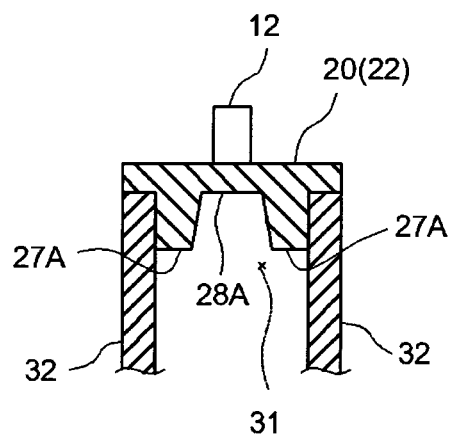
FIG. 4 is a sectional view taken along a line IV-IV in FIG. 1.

As shown in FIG. 4, the increased-thickness molded part 27A according to this embodiment is formed by reducing the thickness of the adjacent inner part 28A through a pressing process such that simultaneously, the two convex portion long side portions 27 adjacent to the reduced-thickness molded part 28A are increased in thickness. The thickness increasing molding and thickness reduction molding processes can be performed easily in a conventional pressing process. Briefly, the thin plate-form sealing plate (i.e. the sealing plate constituted by the fitting convex portion and the main body portion prior to the thickness increasing and thickness reduction molding) 20, which has been molded into a predetermined shape in advance, is set in a thickness increasing die, and the part 28A of the fitting convex portion inner part 28 is pressed using a punch having a predetermined shape. As a result, the pressed part 28A is reduced in thickness. By providing a predetermined void between the press and the die, or more specifically above the outer peripheral parts 27A adjacent to the pressed inner part 28A, at this time, press molding is performed such that a part of the sealing plate 20 enters the void, and as a result, the thickness (fitting step) of these parts 27A of the outer peripheral part is increased, thereby forming the increased-thickness molded parts 27A. Note that the pressing method (thickness increasing method) itself may be performed similarly to a conventional thickness increasing pressing method, and therefore further detailed description thereof has been omitted.

By increasing the thickness of a part of the convex portion long side portion 27 of the fitting convex portion 24 to be thicker (typically, approximately 1.2 to 3 times thicker or preferably approximately 1.5 to 2 times thicker than the other outer peripheral parts of the fitting convex portion 24 not subjected to thickness increasing molding) than the other outer peripheral parts in this manner, a large fitting step can be secured in this part, and as a result, the sealing plate 20 can be positioned accurately when attached to the case opening portion 31. When the positioning precision is improved in this manner, welding can be performed correctly in a predetermined position, leading to an improvement in welding strength (more specifically, a reduction in the probability of welding defects) (see the test example to be described below). Furthermore, since the increased-thickness molded part 27A is formed by pressing (here, as a result of the formation of the reduced-thickness molded part 28A), increases in the amount of material and the thickness of the sealing plate 20 do not occur. Hence, an improvement in welding strength (a reduction in the probability of welding defects) and so on can be realized favorably while preventing cost increases.

The sealing plate 20 (main body portion 22) is then disposed on the opening portion 31 while inserting the fitting convex portion 24 provided with the increased-thickness molded part 27A into the case opening portion 31. At this time, the sealing plate 20 according to this embodiment is not formed with an excessively thick increased-thickness molded part on the convex portion short side portion 25 side, and therefore scraping can be prevented during attachment of the sealing plate 20.

The case 30 is then sealed by performing laser welding on a boundary between the sealing plate 20 and the peripheral wall (the case long side portions 32 and short side portions 36) of the case opening portion 31. Note that the welding technique may be similar to a technique (for example, laser welding using a YAG laser, a $CO_2$ laser, or similar as a heat source) used to weld a conventional battery case to a sealing plate), and since the welding technique is not a feature of the present invention, detailed description thereof has been omitted.

A preferred embodiment of the present invention was described above with reference to FIGS. 1 to 4, but the present invention is not limited to the sealing plate having the shape described above.

When the present invention is applied to the rectangular flat battery case 10 shown in the drawings, the increased-thickness molded part 27A may be provided on the two end portions of the long side (convex portion long side portion) of the outer peripheral part of the fitting convex portion, as in this embodiment, or over the entire long side region.

Figure 5:
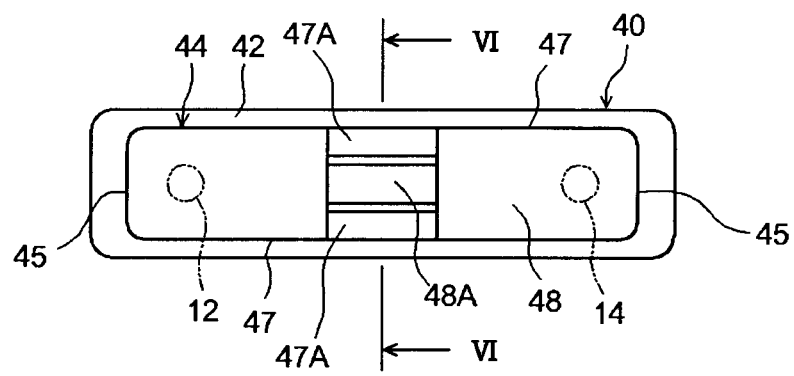
FIG. 5 is a plan view showing a rear surface side structure of a sealing plate according to another embodiment.
Figure 6:
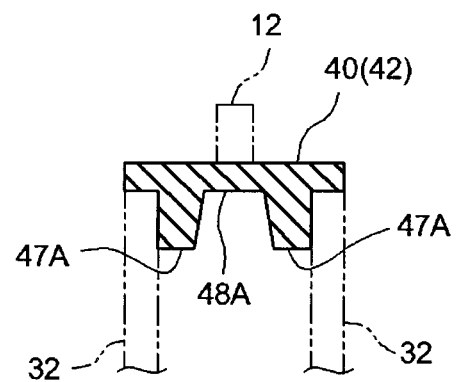
FIG. 6 is a sectional view taken along a line VI-VI in FIG. 5.

Alternatively, an increased-thickness molded part 47A may be provided in the positions shown in FIGS. 5 and 6 as a second embodiment. More specifically, as shown in the drawings, a sealing plate 40 according to the second embodiment is constituted by a rectangular plate-shaped main body portion (substrate) 42 and a fitting convex portion 44 formed on the rear surface side of the main body portion 42, similarly to the sealing plate 20 of the embodiment described above.

As shown in FIG. 5, the outer peripheral part of the fitting convex portion 44 is constituted by convex portion long side portions 47 and convex portion short side portions 45. The increased-thickness molded part 47A according to this embodiment is formed in a central part of each of the pair of convex portion long side portions 47 (i.e. in one location per side for a total of two locations). Further, a reduced-thickness molded part 48A is formed in an inner part 48 adjacent to the increased-thickness molded parts 47A (i.e. in one location).

As shown in FIG. 6, the increased-thickness molded part 47A according to this embodiment is formed by reducing the thickness of the adjacent inner part 48A in a pressing process such that simultaneously, the two convex portion long side portions 47 adjacent to the reduced-thickness molded part 48A are increased in thickness, similarly to the first embodiment.

Similar effects to those of the first embodiment can be obtained when the increased-thickness molded part 47A is provided in the center of the long side portion 47. More specifically, a large fitting step can be secured in the corresponding site, and as a result, the sealing plate 40 can be positioned accurately when attached to the case opening portion 31. When the positioning precision is improved in this manner, welding can be performed easily and correctly in a predetermined position, leading to an improvement in welding strength (more specifically, a reduction in the probability of welding defects). Furthermore, since the increased-thickness molded part 47A is formed by pressing (here, as a result of the formation of the reduced-thickness molded part 48A), increases in the amount of material and the thickness of the sealing plate 40 do not occur, and therefore an improvement in welding strength (a reduction in the probability of welding defects) and so on can be realized favorably while preventing cost increases.

A test example relating to the present invention will be described below. However, the present invention is not limited to this specific example.

An aluminum angular case having a size of 150 mm (long side portion)×30 mm (short side portion)×100 mm (height) and a thickness of 1 mm over the entire periphery was prepared (see FIG. 1). Further, an aluminum sealing plate having a size of 150 mm (long side portion)×30 mm (short side portion) and a thickness of 3 mm (specifically, the thickness of the main body portion was set at 2.5 mm and the thickness of the fitting convex portion was set at 0.5 mm) was prepared. In this test example, the following four sealing plates having differently shaped fitting convex portions were used.

Figure 3:
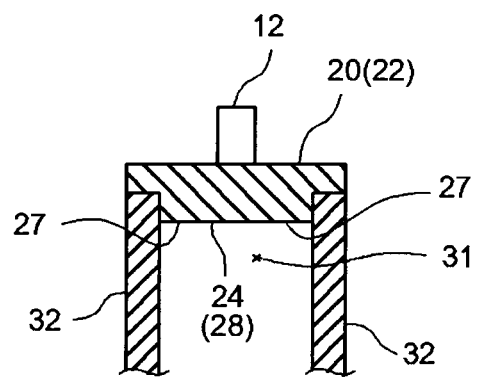
FIG. 3 is a sectional view taken along a line in FIG. 1.

Firstly, the sealing plate 20 having the fitting convex portion 24 shown in FIGS. 2 to 4, i.e. the first embodiment, was used as a first example. More specifically, the sealing plate 20 provided with the increased-thickness molded part 27A on either end portion of the convex portion long side portion 27 was used. The step of the sealing plate 20 (i.e. the height from the main body portion 22 to the top surface of the fitting convex portion 24) was 0.9 mm in the increased-thickness molded part 27A and 0.5 mm in the other parts.

Secondly, the sealing plate 40 having the fitting convex portion 44 shown in FIGS. 5 and 6, i.e. the second embodiment, was used as a second example. More specifically, the sealing plate 40 provided with the increased-thickness molded part 47A in the central portion of the convex portion long side portion 47 was used. The step of the sealing plate 40 (i.e. the height from the main body portion 42 to the top surface of the fitting convex portion 44) was 0.9 mm in the increased-thickness molded part 47A and 0.5 mm in the other parts.

Figure 7:
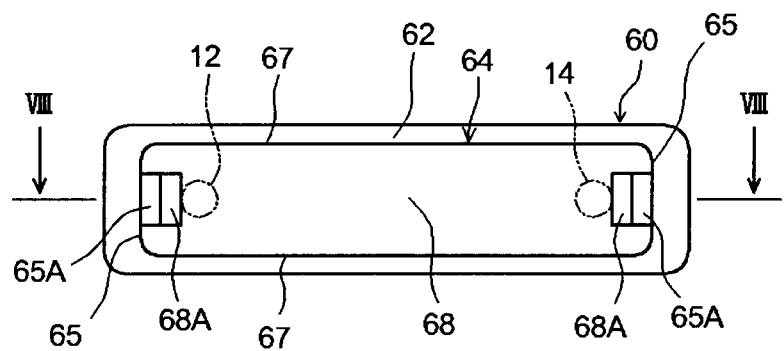
FIG. 7 is a plan view showing a rear surface side structure of a sealing plate according to another embodiment.
Figure 8:
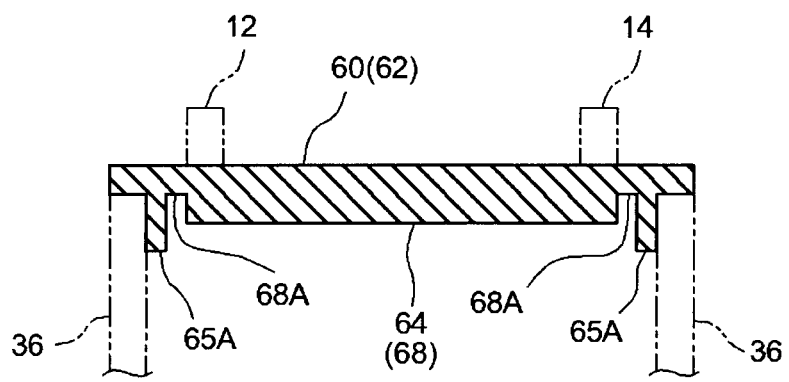
FIG. 8 is a sectional view taken along a line VIII-VIII in FIG. 7.

Thirdly, a sealing plate 60 having a fitting convex portion 64 shown in FIGS. 7 and 8 was used as a first comparative example. Specifically, as shown in FIG. 7, the outer peripheral part of the fitting convex portion 64 is constituted by convex portion long side portions 67 and convex portion short side portions 65. An increased-thickness molded part 65A is formed in a central part of each of the pair of convex portion short side portions 65 (i.e. in one location per side for a total of two locations). Further, a reduced-thickness molded part 68A is formed in an inner part 68 adjacent to the increased-thickness molded part 65A. As shown in FIG. 8, the increased-thickness molded part 65A according to the first comparative example is formed by reducing the thickness of the adjacent inner part 68A in a pressing process such that simultaneously, the two convex portion short side portions 65 adjacent to the reduced-thickness molded part 68A are increased in thickness, similarly to the first and second embodiments (the first and second examples). The step of the sealing plate 60 (i.e. the height from a main body portion 62 to the top surface of the fitting convex portion 64) was 0.9 mm in the increased-thickness molded part 65A and 0.5 mm in the other parts.

Figure 9:
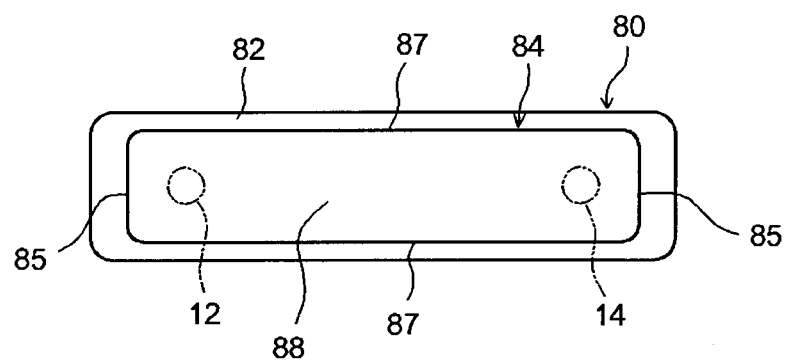
FIG. 9 is a plan view showing a rear surface side structure of a sealing plate according to another embodiment.

Fourthly, a sealing plate 80 having a fitting convex portion 84 shown in FIG. 9 was used as a second comparative example. Specifically, a sealing plate 80 in which neither convex portion long side portions 87 nor convex portion short side portions 85 were provided with an increased-thickness molded part was used (in other words, pressing thickness increasing processing was not implemented). The step of the sealing plate 80 (i.e. the height from a main body portion 82 to the top surface of the fitting convex portion 84) was 0.5 mm over the entirety of the outer peripheral parts 85, 87 and an inner part 88 (see FIG. 3 for reference).

These four sealing plates were then used to check for the occurrence of scraping during attachment and compressive strength following laser welding. Note that this test example relates to a structure for sealing an angular case opening portion using a sealing plate, which is a feature of the present invention, and since the electrode body unit and the electrolyte are not required in relation to the test objectives, these battery components are not housed in the case.

TABLE 1

| | FORMATION POSITION OF INCREASED-THICKNESS MOLDED PART | COMPRESSION STRENGTH (MPa) (AVERAGE VALUE N = 10) | OCCURRENCE OF SCRAPING (N = 10) |
|---|---|---|---|
| FIRST EXAMPLE | TWO ENDS OF LONG SIDE PORTION | 5.3 | ○ (NONE) |
| SECOND EXAMPLE | CENTER OF LONG SIDE PORTION | 5.0 | ○ (NONE) |
| FIRST COMPARATIVE EXAMPLE | CENTER OF SHORT SIDE PORTION | 2.8 | X (ALL) |
| SECOND COMPARATIVE EXAMPLE | NONE | 3.1 | ○ (NONE) |

Occurrence of Scraping

First, the interval between the long side portions of the opening portion of the angular case was widened by deforming the long side portion central parts of the case opening portion outward, and then the sealing plate was attached to the opening portion while inserting the fitting convex portion into the case opening portion. When the attachment process was complete, the presence of scrapings fallen into the angular case was determined by visual observation. The attachment operation was performed ten times with each sealing plate. The results are shown in Table 1.

As shown in the table, no scrapings whatsoever were found during the ten attachment operations in the first example, second example, and second comparative example ("O (NONE)" in the table). In the first comparative example, on the other hand, scrapings were found after all ten of the attachment operations ("x (ALL)" in the table).

Compression Strength

The attached sealing plate was laser-welded to the angular case. More specifically, the angular case (see FIG. 1) was fixed to an XYZ stage with the sealing plate attached in a predetermined position, whereupon welding was performed by irradiating the entire periphery of the boundary part between the case and the sealing plate with a laser (for example, a hybrid laser of a YAG pulse laser and a CW laser). Next, a hole was opened in the sealing plate, oil (silicone oil or the like) was injected into the case, and a limit internal pressure (i.e. the pressure of the injected oil) at the point where a crack appears in the welded part (i.e. the injected oil leaks) was measured. The compression strength test described above was performed in all of the ten welding cases relating respectively to the first example, second example, first comparative example, and second comparative example, and an average value was determined. The results are shown in Table 1.

As shown in the table, the first example and second example, in which the increased-thickness molded part is formed on the convex portion long side portion side, exhibited particularly high compression strength. On the other hand, the compression strength of the first comparative example and second comparative example was low. When a flat rectangular case such as that of this test example was used and an increased-thickness molded part was formed on the convex portion short side portion side of the sealing plate, no effects were observed in relation to an improvement in welding strength.

As is evident from the test example described above, according to the present invention, great welding strength can be realized between the sealing plate and the case (main body). Accordingly, a highly reliable battery (for example, a rectangular (angular) battery having an electrode body unit and a battery case formed in a flat shape) can be provided.

INDUSTRIAL APPLICABILITY

Figure 10:
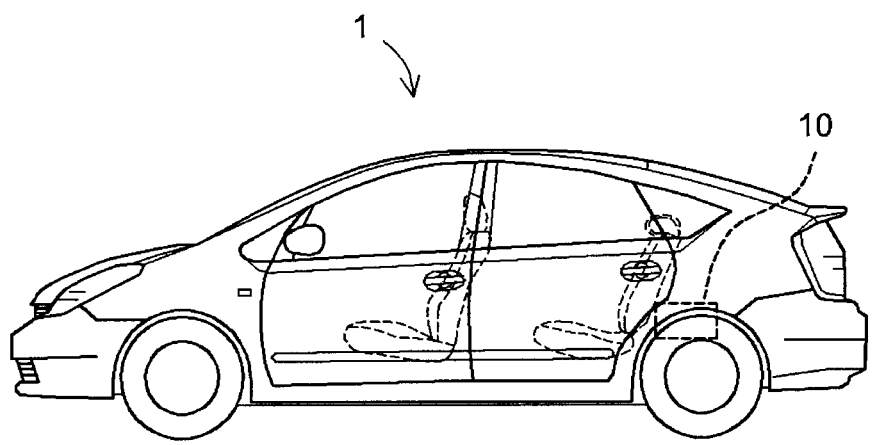
FIG. 10 is a side pattern diagram showing a vehicle (an automobile) including the battery according to the present invention.

The battery provided by the present invention (particularly preferably a secondary battery such as a lithium ion battery, another lithium secondary battery, or a nickel hydrogen secondary battery) may be used particularly favorably as a power source for a motor installed in a vehicle such as an automobile. Hence, according to the present invention, a vehicle (typically an automobile, in particular an automobile including a motor such as a hybrid automobile, an electric automobile, or a fuel cell automobile) 1 having the battery 10 (typically, a battery pack formed by connecting a plurality of the single cell batteries 10 in series) provided by the present invention as a power source can be provided, as shown in pattern form in FIG. 10.

The invention claimed is:

1. A battery comprising:
an electrode body unit;
a case having a shape that corresponds to a shape of said electrode body unit; and
a sealing plate for closing an opening portion of said case in which said electrode body unit is housed, wherein
a rear surface side of said sealing plate is formed with a fitting convex portion that intrudes into said case opening portion when said sealing plate is attached to a predetermined position of said case opening portion, and
at least a part of an outer peripheral part of said fitting convex portion that contacts a peripheral edge of said case opening portion is composed of an increased thickness molded part, which is thicker than an inner part of said fitting convex portion that does not contact said peripheral edge of said case opening portion.

2. The battery according to claim 1, wherein the increase in thickness in at least said part of said outer peripheral part of said fitting convex portion is realized by subjecting at least a part of said inner part of said fitting convex portion, which is adjacent to said increased thickness part, to thickness reduction molding in a pressing process.

3. A vehicle, comprising a battery pack as a power source, wherein the pattery pack is formed by connecting a plurality of batteries according to claim 1 in series.

4. The battery according to claim 1, wherein a flat electrode body unit is used as said electrode body unit, and said case is a rectangular case in which said peripheral edge of said opening portion capable of housing said electrode body unit is constituted by a pair of case long side portions and a pair of case short side portions, and
said increased-thickness molded part is formed on at least a part of a long side of said outer peripheral part of said fitting convex portion, which opposes said case long side portions.

5. The battery according to claim 4, wherein said increased-thickness molded part is not formed on a short side of said outer peripheral part of said fitting convex portion, which opposes said case short side portions.

6. A vehicle, comprising a battery pack as a power source, wherein the battery pack is formed by connecting a plurality of the batteries according to claim 4 in series.

7. The battery according to claim 4, wherein said increased-thickness molded part is formed on either end portion of said long side of said outer peripheral part of said fitting convex portion.

8. The battery according to claim 4, wherein said increased-thickness molded part is formed in a central portion of said long side of said outer peripheral part of said fitting convex portion.

9. The battery according to claim 8, wherein said increased-thickness molded part is not formed on a short side of said outer peripheral part of said fitting convex portion, which opposes said case short side portions.

10. The battery according to claim 7, wherein said increased-thickness molded part is not formed on a short side of said outer peripheral part of said fitting convex portion, which opposes said case short side portions.

* * * * *